United States Patent
Kuruba et al.

(10) Patent No.: US 12,437,007 B2
(45) Date of Patent: Oct. 7, 2025

(54) SYSTEM AND METHOD FOR DOCUMENT RETRIEVAL WITH DOMAIN ADAPTION AND OUT OF DISTRIBUTION IDENTIFICATION

(71) Applicant: Dell Products L.P., Round Rock, TX (US)

(72) Inventors: Ajay Kumar Kuruba, Anantapur (IN); Saurabh Jha, Austin, TX (US); Adya Jha, Bengaluru (IN); Atul Kumar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/405,215

(22) Filed: Jan. 5, 2024

(65) Prior Publication Data
US 2025/0225187 A1    Jul. 10, 2025

(51) Int. Cl.
| | | |
|---|---|---|
| *G06F 7/00* | (2006.01) | |
| *G06F 16/215* | (2019.01) | |
| *G06F 16/28* | (2019.01) | |
| *G06F 16/93* | (2019.01) | |

(52) U.S. Cl.
CPC ............ *G06F 16/93* (2019.01); *G06F 16/215* (2019.01); *G06F 16/285* (2019.01)

(58) Field of Classification Search
CPC ....... G06F 16/93; G06F 16/215; G06F 16/285
See application file for complete search history.

(56) References Cited

U.S. PATENT DOCUMENTS

| | | | | |
|---|---|---|---|---|
| 7,092,888 | B1* | 8/2006 | McCarthy | G10L 15/1822 704/277 |
| 10,346,540 | B2* | 7/2019 | Karov | G06F 40/211 |
| 10,445,745 | B1* | 10/2019 | Chopra | G06F 16/3344 |
| 11,900,066 | B2* | 2/2024 | Venkateshwaran | G06F 16/367 |
| 2005/0108200 | A1* | 5/2005 | Meik | G06F 16/954 |
| 2005/0138026 | A1* | 6/2005 | Liu | G06F 16/355 707/999.005 |
| 2014/0200878 | A1* | 7/2014 | Mylonakis | G06F 40/51 704/4 |
| 2014/0358890 | A1* | 12/2014 | Chen | G06F 16/9535 707/710 |
| 2015/0254233 | A1* | 9/2015 | Artzi | G06F 40/216 704/9 |
| 2019/0042988 | A1* | 2/2019 | Brown | G06F 16/9535 |
| 2019/0339769 | A1* | 11/2019 | Cox | G06F 3/016 |
| 2020/0019893 | A1* | 1/2020 | Lu | G06N 5/025 |
| 2020/0293874 | A1* | 9/2020 | Ji | G06N 3/08 |
| 2021/0034809 | A1* | 2/2021 | Potash | G06N 3/086 |
| 2021/0157861 | A1* | 5/2021 | Katzman | G06F 16/93 |
| 2021/0328888 | A1* | 10/2021 | Rath | H04L 41/5074 |
| 2021/0374338 | A1* | 12/2021 | Shrivastava | G06F 40/30 |
| 2022/0122596 | A1* | 4/2022 | Jessa | G10L 15/063 |

(Continued)

*Primary Examiner* — Mohammed R Uddin
(74) *Attorney, Agent, or Firm* — Workman Nydegger

(57) ABSTRACT

Document retrieval with domain adaptation and out of distribution identification is disclosed. Custom layers are added to a model without impacting base weights. The custom layers are trained using a domain specific dataset and topic identifiers. When executing a query, the custom layers use weights associated with a topic identifier. If a potential result is sufficiently similar, the result is returned in response to the query. Otherwise, the result is out of distribution and no result is returned.

18 Claims, 10 Drawing Sheets

(56) References Cited

U.S. PATENT DOCUMENTS

| | | | |
|---|---|---|---|
| 2022/0230089 A1* | 7/2022 | Peraud | G06N 3/082 |
| 2022/0365993 A1* | 11/2022 | Voisin | G06F 40/30 |
| 2022/0405484 A1* | 12/2022 | Kanchibhotla | G06N 5/022 |
| 2023/0139831 A1* | 5/2023 | Wang | G06V 30/1444 |
| | | | 704/9 |
| 2023/0205824 A1* | 6/2023 | Jablokov | G06F 16/3329 |
| | | | 707/737 |
| 2023/0317066 A1* | 10/2023 | Hueser | G10L 15/063 |
| | | | 704/243 |
| 2024/0037126 A1* | 2/2024 | Allouche | G06F 40/30 |
| 2024/0152538 A1* | 5/2024 | Kurshan | G06N 5/02 |
| 2024/0193445 A1* | 6/2024 | Dong | G06N 5/043 |

* cited by examiner

Product Details:

- Designed from the inside-out, components are laid out in perfect harmony enabling performance, easy upgrades, and optimized acoustics.
- An optional, scratch-resistant, and EMI shielded clear side panel will become available for the first time on all Alienware Aurora globally.
- Features up to 4x 120mm fans in our highest end configurations.
- Our evolved chassis is effectively delivering 1.5x the internal volume compared to Aurora based on Legend 1.0 designs.
- Graphics performance increased by 5% using the same NVIDIA GeForce RTX 3090 graphics card while running 3DMark TimeSpy graphics score tests when compared to the predecessor.
- Our AlienFX customizable lighting capabilities have increased. The previous Aurora R10 desktop contained a maximum of 4 externally facing lighting zones. The next generation of Aurora Ryzen Edition desktops will support up to 6 lighting zones including various internal enhanced and traditional lighting capabilities.
- We've introduced a custom motherboard that places power connections towards the edges to eliminate any chance of airflow obstruction and eliminates the need for a daughter board for front I/O to reduce internal wiring needs. Each USB port has direct link into the core architecture.
- Motherboard and power connection have all been positioned towards the boundary of the motherboard to reduce cable clutter and promote airflow. A meticulous cable routing system has been designed along the right side of the chassis to manage any services or upgrades over time with mechanically isolated cables.

Key Technology Architecture — 240

- Up to AMD Ryzen 9 processors
- AMD B550 Chipset
- Up to AMD Radeon RX 6900XT or NVIDIA GeForce RTX 3090 graphics
- DDR4 XMP RAM (up to 128GB 3600MHz)
- Optional 750W Platinum Rated Power Supply
- Offering up to 4TB NVMe M.2 PCIe SSD Support (with 2TB Boot and 2TB Storage)
- Standard 2.5G Ethernet and optional WI-FI 6 2x2 WLAN with Bluetooth 5.2

System Dimensions

- Length: 589 mm (23.2 in.)
- Length (without cable cover): 529 mm (20.8 in.)
- Width: 225 mm (8.86 in.)
- Height: 510 mm (20.1 in.)
- Maximum weight: 16.5 Kg (36.4 lbs.)

Figure 2B

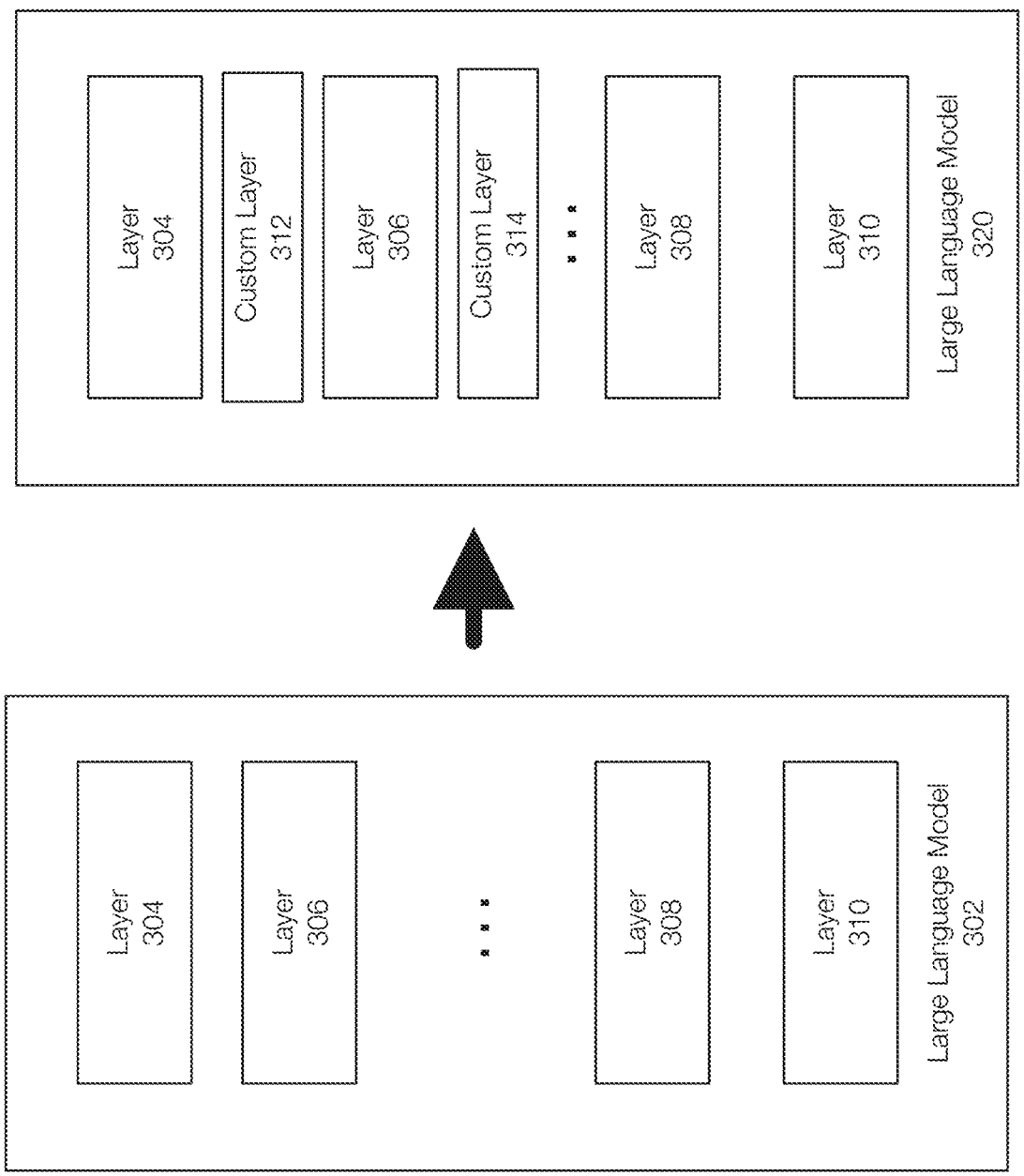

SYSTEM AND METHOD FOR DOCUMENT RETRIEVAL WITH DOMAIN ADAPTION AND OUT OF DISTRIBUTION IDENTIFICATION

FIELD OF THE INVENTION

Embodiments of the present invention generally relate to information retrieval and model based searching. More particularly, at least some embodiments of the invention relate to systems, hardware, software, computer-readable media, and methods for searching a knowledge base and retrieving information such as documents.

BACKGROUND

Large language models provide a variety of benefits and end-users are interacting with large language models more frequently for various reasons. However, large language models are generalists and perform very well in various tasks such as summarization and sentiment analysis. This generality is reflected in the difficulty of large language models to adapt to specific domains.

More specifically, adapting a large language model to a specific domain or a specific use case is challenging because the data needed for training is often insufficient and has a high chance of causing catastrophic forgetting in the large language model. Further, adding thousands of domain specific tokens has a high perplexity score.

Essentially, creating a single knowledge embedding of multidomain specific data is not feasible because large language models work on the idea of generalization. As a result, using the same language model on multiple domain specific data sources may compromise the accuracy of the model at least because large language models have difficulty in providing generalizations between correlated and uncorrelated sources.

For example, large language models are increasingly employed in the context of customer service. Customers want to spend less time interacting with customer service and, at the same time, expect to be able to reach a company anytime and anywhere, regardless of time, location, and channel. Customers want accurate answers to their questions without little delay. Because attracting and retaining customers is impacted by customer experience and customer satisfaction, large language models are being employed in an attempt to provide customers with an immediate and accurate response.

However, large language models and domain specific tasks are not feasible due in part to the very large cost of training the model, the lack of training data, and the potential of adversely impacting the function of the large language model (e.g., causing catastrophic forgetting).

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2B discloses aspects of example data to be added to a knowledge base;

FIG. 3 discloses aspects of adapting a large language model to a specific domain;

DETAILED DESCRIPTION OF SOME EXAMPLE EMBODIMENTS

Figure 1:
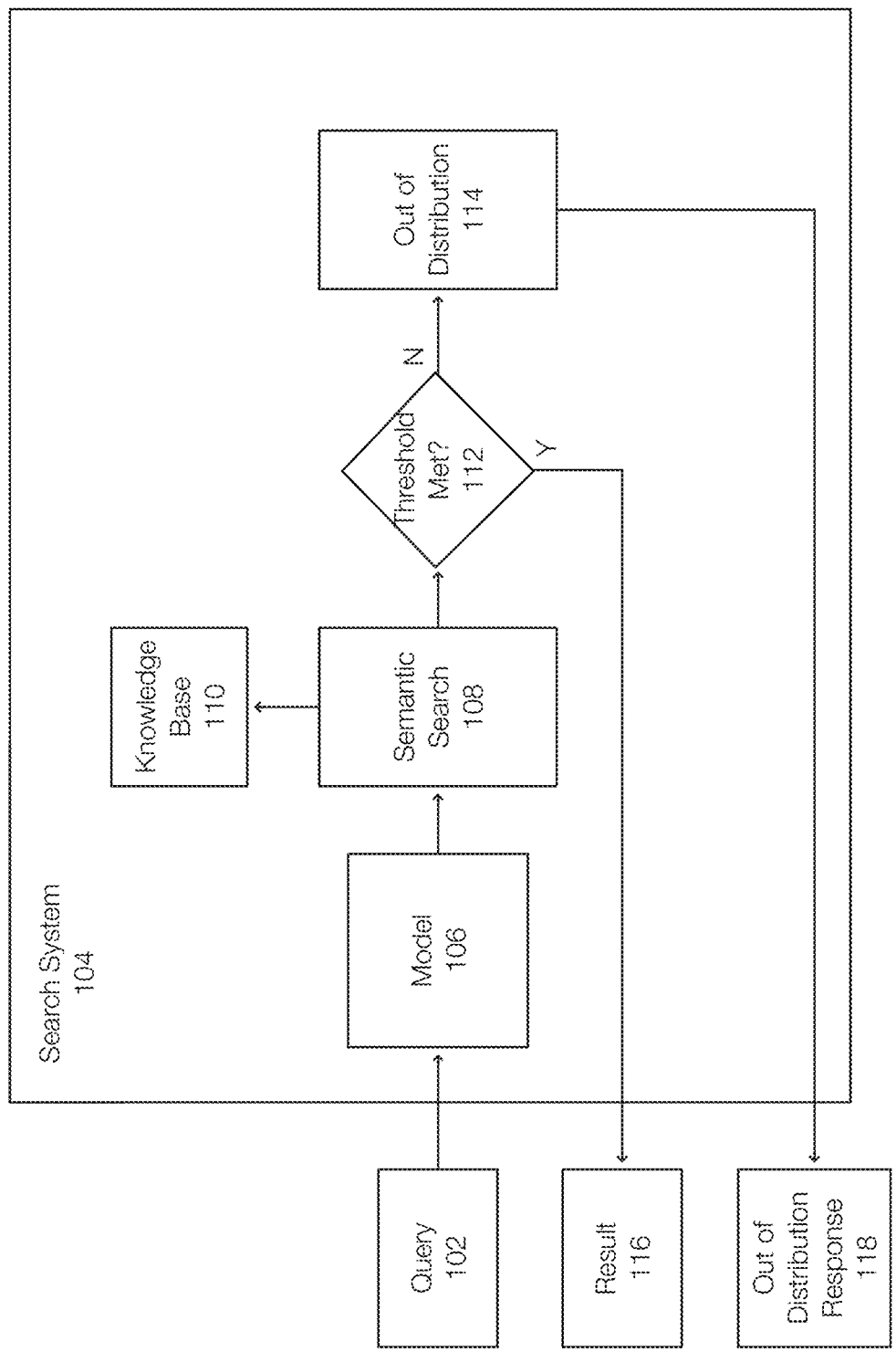
FIG. 1 discloses aspects of a search-based query management system that includes a domain adapted large language model.

Embodiments of the present invention generally relate to large language models and document retrieval. More particularly, at least some embodiments of the invention relate to systems, hardware, software, computer-readable media, and methods for training large language models or adapting large language models to specific domains for document retrieval and out of distribution identification.

Customer satisfaction is a key metric for many businesses and entities. In order to meet customer service demand and provide improved customer service, by way of example, embodiments of the invention relate to an information retrieval system to facilitate the ability to understand a user or customer's query and provide relevant information (e.g., documents) from a knowledge base. Embodiments of the invention adapt large language models to specific domains without impacting the generalist nature of the large language models and without causing catastrophic forgetting.

Embodiments of the invention relate to a robust knowledge search system that employs a large language model that has been adapted to at least one specific domain. Embodiments of the invention relate to training large language models to learn domain specific vocabulary using relatively small training data sets and without impacting the weights and previous training of the large language models.

Embodiments of the invention allow, by way of example, large language models to be quickly adapted to specific domains for various purposes including customer service. For example, handling customer queries in often performed using front-line representatives. These representatives may take calls via telephone, chat, email, or the like. However, a customer's query can vary in terms of answerability. Some queries can be handled quickly and easily, such as sending a customer a link to an article. However, representatives that spend time answering these types of queries are, in effect, delaying other more pertinent customer issues. Embodiments of the invention relate to an automated, smart search system that can understand customer (or user) queries and provide an accurate, prompt response, thereby improving customer service and customer satisfaction. More difficult or pertinent queries, if necessary, can be handled by representatives.

Large language models, which are examples of deep learning based solutions, can fetch data and create a structured result from digital documents. As previously stated, however, domain adaptation, pretraining, and finetuning large models is more difficult and embodiments of the invention relate to adapting search-based systems or large language models to specific domains.

Adapting large language models to specific domains may include pretraining and finetuning. Embodiments of the invention adapt large language models to specific domains using intermediate or custom layers that may be incorporated into the large language model. These custom layers can be trained and finetuned and allow the model to be adapted to a particular domain. Creating intermediate or custom layers allows queries to be routed using domain specific weights thereby adapting large language models to domain specific datasets.

More specifically, embodiments of the invention relate to generating intermediate or custom layers that can transform and route or generate a solution use domain specific weights that help transform the use of large language models in domain specific datasets. Embodiments of the invention relate to pretraining and finetuning using domain specific datasets that are typically insufficient for training the model as a whole. Embodiments of the invention thus relate to document retrieval with domain adaptation and out of distribution generalization on data including unstructured data.

FIG. 1 discloses aspects of a search-based query management system that includes a domain adapted large language model. The search system 104 includes a model 106 (e.g., a large language model or a natural language model) that has been adapted to a specific domain. The model 106 may include a large language model that has been adapted to recognize or understand the language and vocabulary of a specific domain without losing its generality (without catastrophic forgetting).

The model 106 is configured to understand a context of a query 102. The search system 104 may use the model 106 to perform a search 108 (e.g., a semantic search) in a knowledge base 110. The knowledge base 110 may include domain specific data, such as documents.

More specifically, the search system 104 may receive the query 102 from a user or customer, interpret the query using the model 106 and search 108 the knowledge base 110. The model 106 is configured to interpret human language. The ability to interpret (or understand) human language (e.g., context, semantics and other structures) allows the model 106 (and/or semantic search 108) to return relevant results, such as the result 116, to a user or customer.

More specifically in one example, the semantic search 108 and the model 106 may be integrated. The semantic search 108 relies on the model 106 to provide insight into the query 102 (e.g., semantics of the words and phrases in the query and relationships between the words and phrases). In effect, the model 106 improves the effectiveness of the search system 104 by improving the understanding of the query 102 and of the knowledge base 110. This helps ensure that the result 116 is more likely to be relevant to the query 102.

By way of example only, the model 106 may be trained on a large amount of data and have the ability to recognize patterns, context, or the like in a query. When the query 102 is received, the model 106 and the semantic search 108 generates a response based on the learned patterns, which may include syntax, language usage, context, or the like. Generally, the model 106 and semantic search 108 identify potential outputs or solutions and corresponding probabilities. The output or solution with the best probability may be returned as the result 116.

The search system 104 is further configured to conduct out of distribution detection and provide an appropriate response rather than a response that is not relevant. For example, the output or document identified from the knowledge base 110 in response to the query 102 may be subject to a threshold analysis (e.g., a similarity analysis or probability threshold). If the most probable output does not satisfy the similarity threshold or have a sufficient probability (N at 112), then the output or response is out of distribution 114 and an out of distribution response 118 is provided. This allows the user or customer to understand that relevant information is not found and may recommend that the query 102 be reformulated. If the threshold is satisfied (Y at 112), then a result 116 is provided. The result 116 may be a document, a passage from a document, or the like. The result 116 or output generated by the model 106 and semantic search 108 may be a document or passage with a highest probability or similarity to the query 102.

Embodiments of the invention are discussed in the context of a domain such as a company or other entity that sells products/services to customers. The product names and descriptions are an example of a domain specific vocabulary. Embodiments of the invention are not limited to these types of domains and can be applied to various other domains.

Figure 2A:
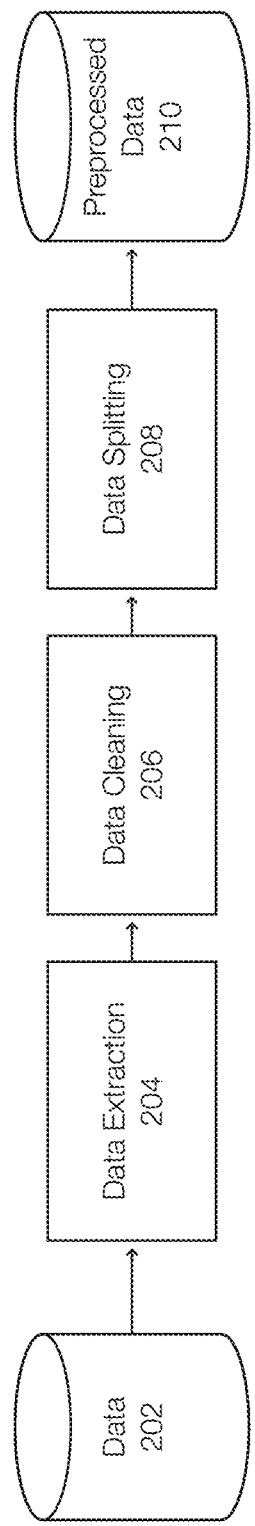
FIG. 2A discloses aspects of preprocessing data.

FIG. 2A discloses aspects of domain specific data that is incorporated into a search based system or that is configured for training a model or a custom layer of a model. FIG. 2A illustrates data 202, which may be stored in various storage devices of an entity and includes or represents domain specific data. The data 202 may be stored as portable document format (pdf) data, word processing data, image data, or the like. The data 202 may include data representing multiple product lines.

For example, a company that sells computing equipment and services may have various product lines such as multiple computer lines (e.g., consumer lines, business lines, gaming lines, portable lines), keyboards, audio devices, mouse, or the like. Each of these product lines may have various models, which are represented by stock keeping unit identifiers (skuids). Each model may be associated with technical documents, specification sheets, and support documents, which are examples of the data 200.

In FIG. 2A, the data 200 from the data source 202 are input into data extraction 204. The data extraction 204 may receive a pdf document as input and output text (e.g., a text document). The text may be subject to data cleaning 206. Data cleaning 206 may remove stop words (e.g., a, and, the) and regular expressions (e.g., a copyright notice on the document).

After the data is cleaned, data splitting 208 is performed. Data splitting 208 splits the data into passages, where each passage is a section. The preprocessed data 210 is then stored in a storage device or system (e.g., as a database).

FIG. 2B illustrates an example of data to be preprocessed as illustrated in FIG. 2A. The data 240, in this example, is a pdf document including product details for a specific product.

Figure 2C:
FIG. 2C discloses aspects of preprocessed data.

FIG. 2C discloses aspects of passages or sections after the data has been extracted from the data source and cleaned. The preprocessed data 250 in this example is divided into passages 252 and 254. The passages 252 and 254 are delineated, by way of example, using "$$$" 256 (other symbols or syntax may be used). The preprocessed data 250 is then stored in a database or other storage.

Figure 2D:
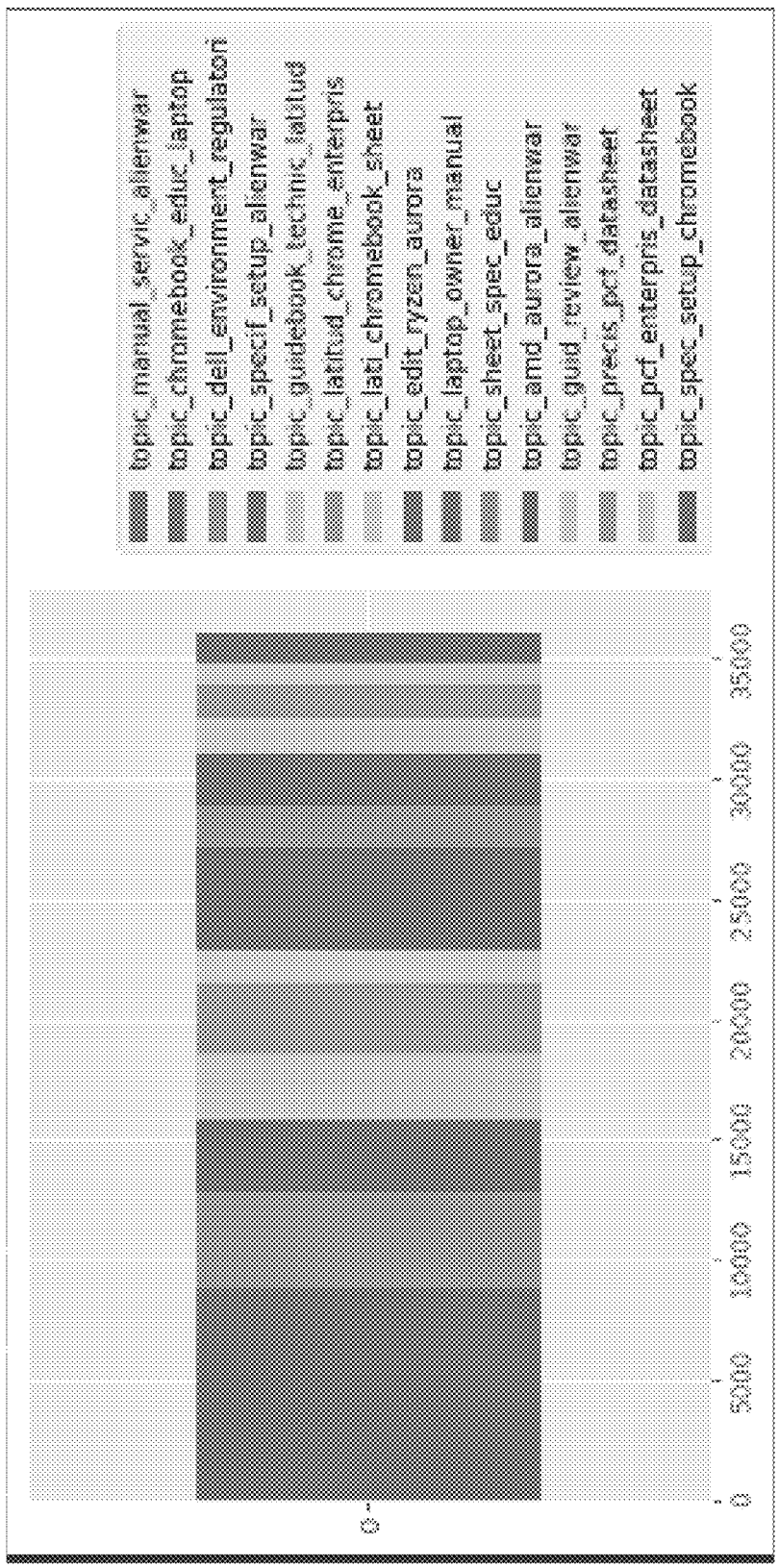
FIG. 2D discloses aspects of topic modelling.

FIG. 2D discloses aspects of topic modelling. After the preprocessed data 250 is generated, topic modelling 260 may be performed on the preprocessed data 210. Topical modelling is a process often performed in natural language processing to identify the topics present in data. In this example topical modelling 260 may identify topics present in the preprocessed data 210. Each of the documents included in the preprocessed data 250 may include multiple topics and each topic may include or be identified by one or more words.

Topic modelling 260 may begin by assigning a document to a topic and a word to that topic. A topic may be associated with a random probability. The document is processed and these probabilities may be updated based on the actual words included in the document being processed. The topical modelling 260 of the preprocessed data 210 may generate a distribution of topics.

More specifically, topic modelling 260 may discover latent topics in a collection of documents, such as the preprocessed data 210. The topic modelling 260 may identify the most significant themes or topics in the collection of documents. The output of topical modelling 260 is used for pretraining and finetuning during domain adaptation of large language models. Topic modelling may also be part of executing the model such that weights associated with a specific topic can be applied.

FIG. 3 discloses aspects of adapting a model to one or more specific domains. FIG. 3 illustrates a large language model 302 that includes various layers, represented by layers 304, 306, 308, and 310. The large language model 320 illustrates or corresponds to the large language model 302 after being adapted to a particular domain. The large language model 320 resulting from adapting the model 302 includes one or more custom layers, represented by custom layers 312 and 314.

When adapting the model 302 to generate the adapted model 320, embodiments of the invention freeze the weights of the base layers (e.g., layers 304, 306, 308, and 310). The custom layers 312 and 314 are configured to provide weights for the domain specific data. The number of custom layers depends on the data available for pretraining and finetuning.

The custom layers 312 and 314 thus allow a domain specific vocabulary to be learned without compromising the other layers of the model 302 and without causing catastrophic forgetting related to previous learning. This allows the model 320 to be trained, finetuned, and the like without impacting the base weights of the model 302.

Figure 4A:
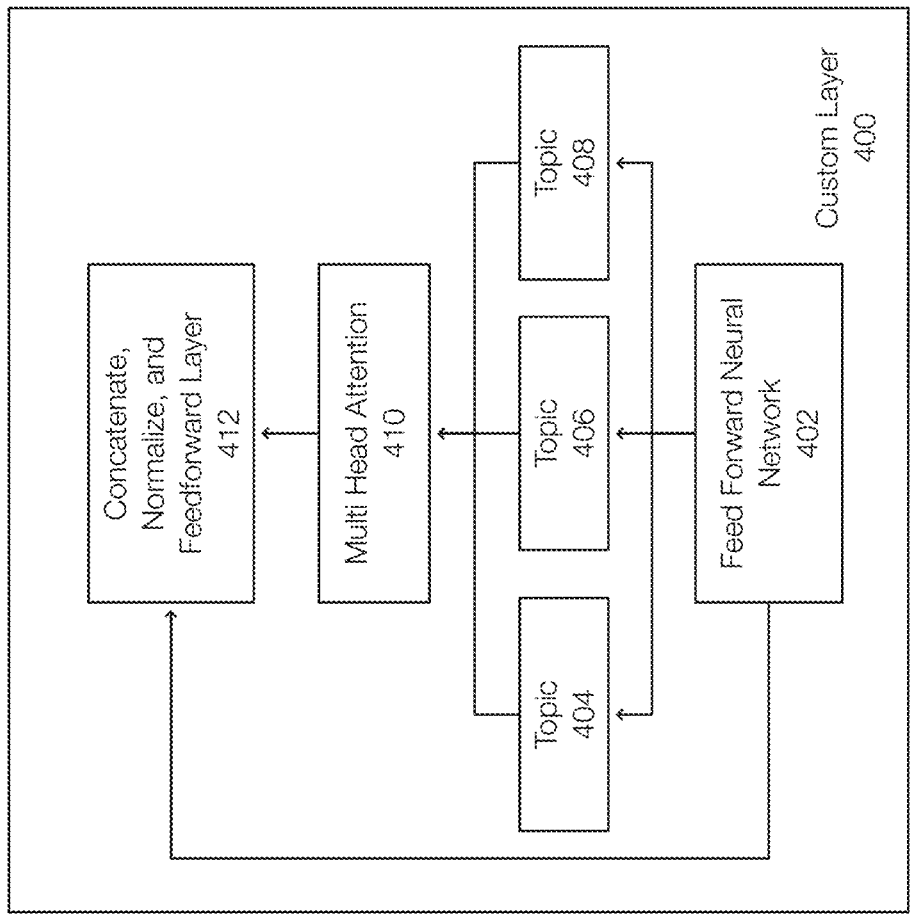
FIG. 4A discloses aspects of a custom layer added to a large language model for domain specific adaptation.

FIG. 4A discloses aspects of a custom layer created or generated when adapting a large language model to a specific domain. The custom layer 400 may include a feed forward neural network 402 or may receive the output from a feed forward neural network 402 in the model. In the custom layer 400, a topic is identified based on the input to the model and/or the topic modelling. FIG. 4A illustrates example topics 404, 406, and 408. Selecting a particular topic allows the weights and modules of the custom layer 400 to be selected based on the topic.

The custom layer 400 can be pretrained and finetuned on smaller datasets. Once the topic is selected (e.g., topic 404) and the weights are determined, multi head attention 410 is performed. Multi head attention 410 allows the model to process the input sequence by capturing different relationships present in the query. The output of the multi head attention 410 is concatenated, normalized, and provided to a feed forward layer 412.

Figure 4B:
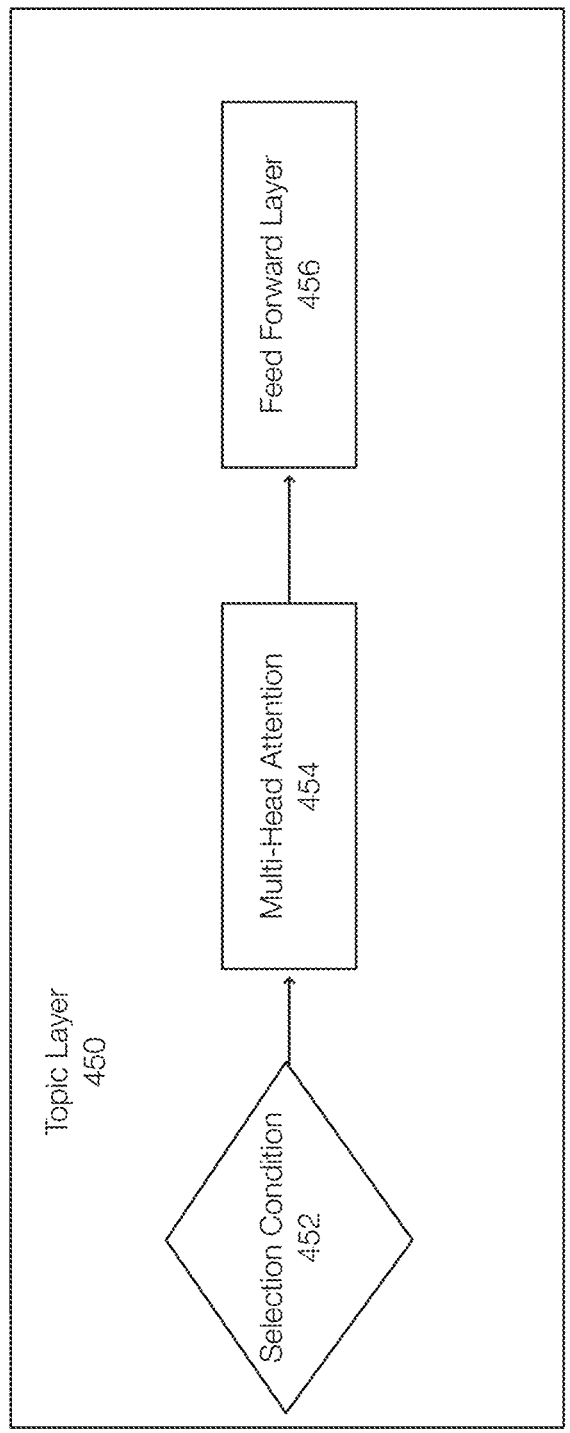
FIG. 4B discloses aspects of a topic layer in a large language model that is adapted to a specific domain.

FIG. 4B discloses additional aspects of a topic layer. The topic layer 450 includes a selection condition 452. The selection condition 452 may be based on topic modelling previously performed. The selected topic (e.g., topic 404, 406, or 408) impacts the weights that are selected and applied. Once the topic is selected and appropriate weights identified, multi-head attention 454 is performed and the output is provided to the feed forward layer 456.

Figure 5:
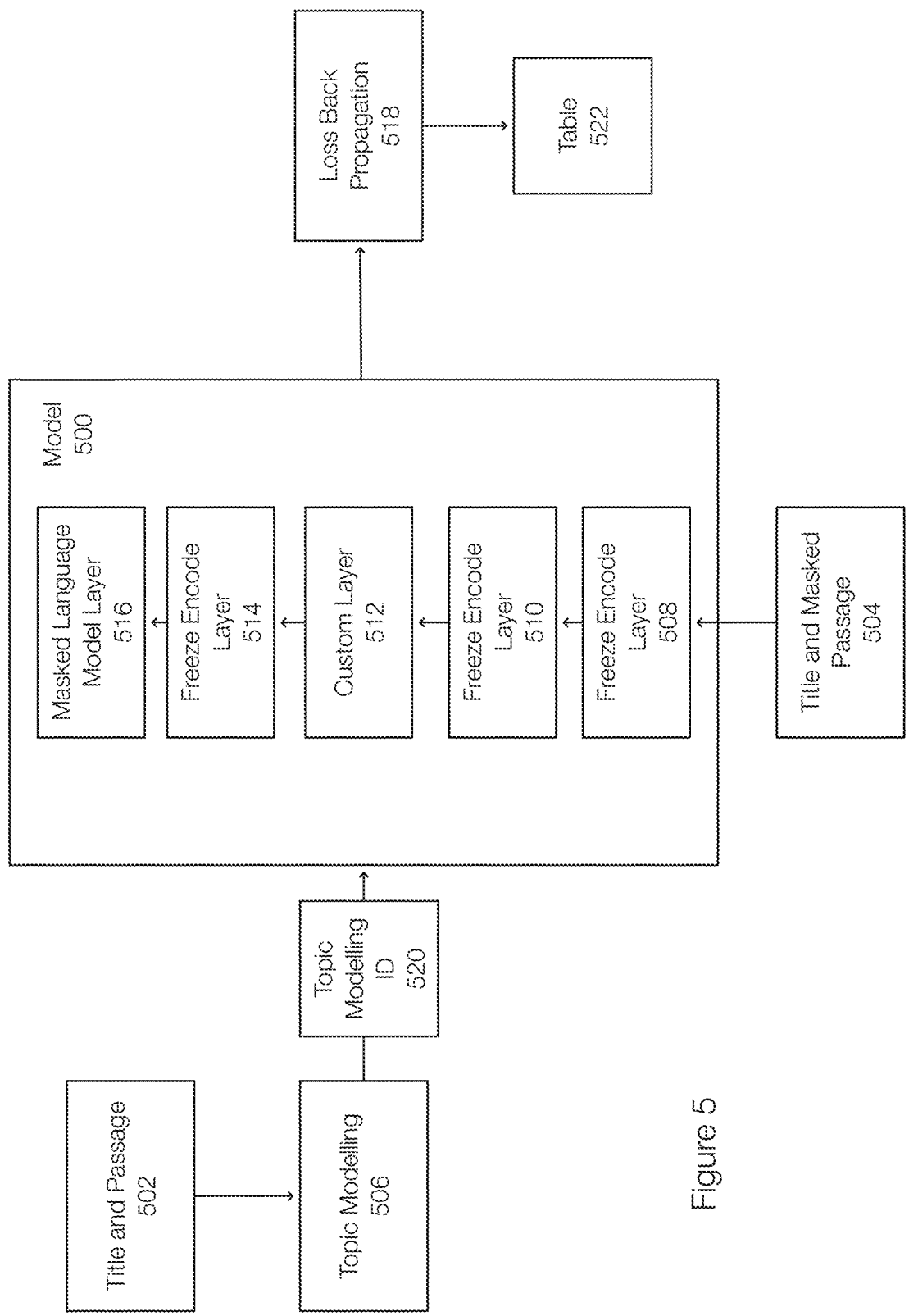
FIG. 5 discloses aspects of pretraining a large language model that is being adapted to a specific domain.

FIG. 5 discloses aspects of adapting a model to a domain and illustrates aspects of pretraining a model. FIG. 5 illustrates a model 500 that includes various layers represented by encode layers 508, 510, and 514. During pretraining, these layers are frozen such that their weights are not changed during pretraining. The custom layer 512 is trained using the preprocessed data. The model may be pretrained normally except that only weights of the custom layer 512 are changed in light of the pretraining.

In one example, a title and passage 502 (e.g., from the preprocessed data 210) are identified and topical modelling 506 may be used to determine a topic modelling identifier 520. The same title and masked passage 504 are input to the model 500. The topic ID 520 may be used to select a topic in the custom layer 512 such that appropriate weights are provided. The other layers 508, 510, and 514 function normally. The masked language model layer 516 may generate or predict the masked aspects of the passage 504.

A loss back propagation 518 is then performed to adjust the weights of the model 500 based on the errors. In this example, however, the weights of the layers 508, 510, and 514 are frozen and not affected. Rather, the weights associated with the topic ID 520 are adjusted. The loss back propagation 518 may include or have access to a table 522 that associates weights with specific topics using the topic identifier 520. Thus, the loss back propagation 518 adjusts weights only for the topic modelling identifier 520. The table 522 may also be used to select specific weights based on the topic of the query.

This allows the custom layer 512 or multiple custom layers to be integrated into the model 500 such that the model learns a domain specific vocabulary without losing its generality. Embodiments of the invention use topic modelling in domain adaptation to pretrain and finetune with smaller datasets. Pretraining with smaller datasets without disturbing the base weights makes a model compatible by learning topic specific weights that allow for a single knowledge source for multiple domains. In addition, the challenges of computation time, pretraining time, and noisy data are reduced as most of the base layers of the model are not disturbed.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/ or cause the implementation of, machine learning operations, large language model operations, domain adaptation operations, semantic search operations, pretraining and finetuning operations, or the like. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating data. As such, a particular client may employ, or otherwise be associated with, one or more instances of each of one or more applications that perform such operations with respect to data. Such clients may comprise physical machines, containers, or virtual machines (VM)

Particularly, devices in the operating environment may take the form of software, physical machines, containers or VMs, or any combination of these, though no particular device implementation or configuration is required for any embodiment. Similarly, data storage system components such as databases, storage servers, storage volumes (LUNs), storage disks, replication services, servers, for example, may likewise take the form of software, physical machines, containers, or virtual machines (VM), though no particular component implementation is required for any embodiment.

As used herein, the term 'data' is intended to be broad in scope. Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: topic modelling a preprocessed dataset to identify topics, each of the topics associated with a topic identifier, wherein the preprocessed dataset is specific to a domain, creating a custom layer in a model, and training the model using the topics and the preprocessed dataset to generate a domain adapted model, wherein only weights associated with the custom layer are changed during the training, wherein the domain adapted model is configured to generate outputs based on queries from users, the outputs including documents or passages of the documents associated with the domain.

Embodiment 2. The method of embodiment 1, further comprising generating the preprocessed dataset from a dataset.

Embodiment 3. The method of embodiment 1 and/or 2, wherein generating the preprocessed dataset includes extracting data from the dataset, cleaning the extracted data, and splitting the extracted and cleaned data into passages.

Embodiment 4. The method of embodiment 1, 2, and/or 3, further comprising training the custom layer by inputting a title and a masked passage that are associated with a topic identifier into the model.

Embodiment 5. The method of embodiment 1, 2, 3, and/or 4, further comprising creating a lookup table that associates topic identifiers with corresponding topic weights.

Embodiment 6. The method of embodiment 1, 2, 3, 4, and/or 5, the domain adapted model further comprising a masked language model layer configured to predict the masked passage.

Embodiment 7. The method of embodiment 1, 2, 3, 4, 5, and/or 6, wherein the custom layer comprises a topic layer.

Embodiment 8. The method of embodiment 1, 2, 3, 4, 5, 6, and/or 7, further comprising selecting a topic based on a query and loading weights associated with the selected topic from a table.

Embodiment 9. The method of embodiment 1, 2, 3, 4, 5, 6, 7, and/or 8, further comprising freezing other layers of the model such that base weights of the other layers are not changed during training of the custom layer.

Embodiment 10. The method of embodiment 1, 2, 3, 4, 5, 6, 7, 8, and/or 9, further comprising generating an out of distribution response when a similarity or probability of an output identified by the domain adapted model is below a threshold.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, agent, client, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
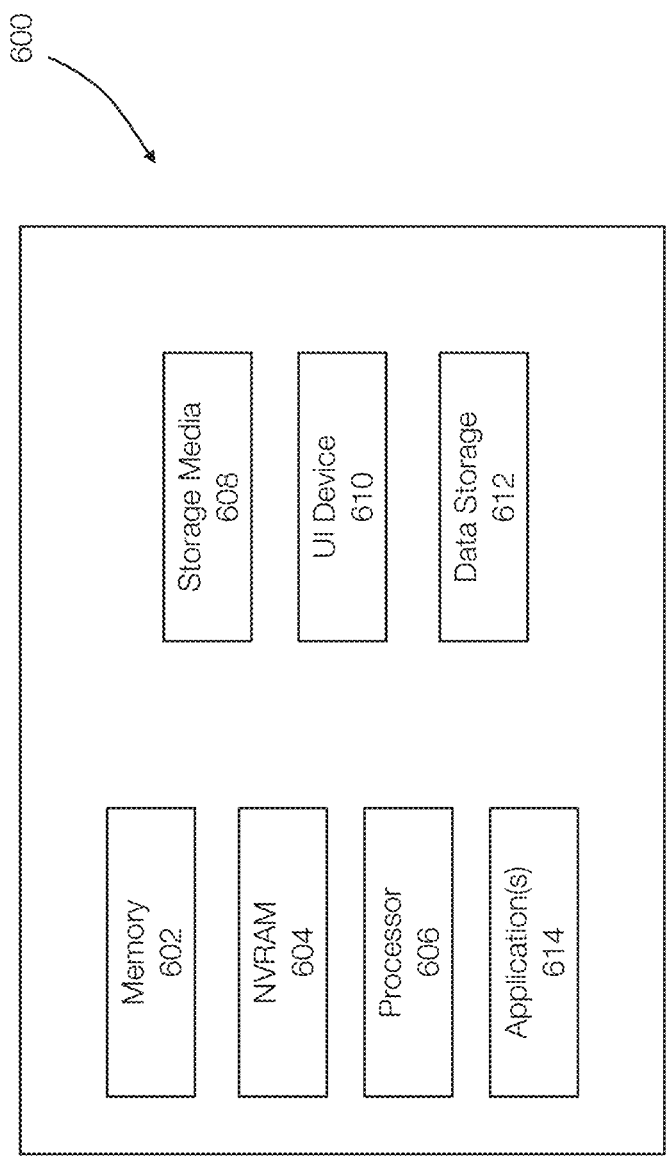
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein. The device 600 may represent one or more physical/virtual machines devices including server clusters, edge systems, cloud systems, and/or on-premise systems.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    topic modelling a preprocessed dataset to identify topics, each of the topics associated with a topic identifier, wherein the preprocessed dataset is specific to a domain;
    creating a custom layer in a model, wherein the model includes a plurality of frozen base layers and the custom layer is positioned between at least two of the base layers;
    associating each topic identifier with a set of topic-specific weights in a lookup table;
    freezing weights associated with the base layers of the model such that the weights are not updated during training; and training the model using the topic identifiers and the preprocessed dataset by inputting a title and a masked passage associated with a topic identifier into the model and updating only the weights of the custom layer, weights being selected from the lookup table based on the topic identifier;

wherein the domain adapted model is configured to generate outputs based on queries from users, the outputs including documents or passages of the documents associated with the domain, and wherein the domain adapted model is further configured to return an out-of-distribution response when a probability or similarity of an output is below a threshold.

2. The method of claim 1, further comprising generating the preprocessed dataset from a dataset.

3. The method of claim 1, wherein generating the preprocessed dataset includes extracting data from the dataset, cleaning the extracted data, and splitting the extracted and cleaned data into the passages.

4. The method of claim 1, further comprising training the custom layer by inputting a title and a masked passage that are associated with a topic identifier into the model, wherein the model includes a masked language model layer configured to predict the masked passage, and wherein only weights in the custom layer are updated based on a loss determined from prediction of the masked passage.

5. The method of claim 4, further comprising creating a lookup table that associates each topic identifiers with corresponding topic-specific weights used to initialize and update the custom layer during training and execution.

6. The method of claim 5, the domain adapted model further comprising a masked language model layer downstream of the custom layer, the masked language model layer being configured to generate the predicted passage, and wherein the loss is back propagated only through the custom layer.

7. The method of claim 1, wherein the custom layer comprises a topic layer.

8. The method of claim 7, further comprising receiving a query from a user, identifying a topic based on the query using topic modelling, and loading the corresponding topic-specific weights from the lookup table into the custom layer for generating an output.

9. The method of claim 1, further comprising generating an out of distribution response when a similarity score or probability of an output generated by the domain adapted model in response to a query is below a predefined threshold.

10. A non-transitory storage medium having stored therein instructions that are executable by one or more hardware processors to perform operations comprising:

topic modelling a preprocessed dataset to identify topics, each of the topics associated with a topic identifier, wherein the preprocessed dataset is specific to a domain;

creating a custom layer in a model, wherein the model includes a plurality of frozen base layers and the custom layer is positioned between at least two of the base layers;

associating each topic identifier with a set of topic-specific weights in a lookup table;

freezing weights associated with the base layers of the model such that the weights are not updated during training; and training the model using the topic identifiers and the preprocessed dataset by inputting a title and a masked passage associated with a topic identifier into the model and updating only the weights of the custom layer, weights being selected from the lookup table based on the topic identifier;

wherein the domain adapted model is configured to generate outputs based on queries from users, the outputs including documents or passages of the documents associated with the domain, and wherein the domain adapted model is further configured to return an out-of-distribution response when a probability or similarity of an output is below a threshold.

11. The non-transitory storage medium of claim 10, further comprising generating the preprocessed dataset from a dataset.

12. The non-transitory storage medium of claim 10, wherein generating the preprocessed dataset includes extracting data from the dataset, cleaning the extracted data, and splitting the extracted and cleaned data into the passages.

13. The non-transitory storage medium of claim 10, further comprising training the custom layer by inputting a title and a masked passage that are associated with a topic identifier into the model, wherein the model includes a masked language model layer configured to predict the masked passage, and wherein only weights in the custom layer are updated based on a loss determined from prediction of the masked passage.

14. The non-transitory storage medium of claim 13, further comprising creating a lookup table that associates each topic identifiers with corresponding topic-specific weights used to initialize and update the custom layer during training and execution.

15. The non-transitory storage medium of claim 14, the domain adapted model further comprising a masked language model layer downstream of the custom layer, the masked language model layer being configured to generate the predicted passage, and wherein the loss is back propagated only through the custom layer.

16. The non-transitory storage medium of claim 10, wherein the custom layer comprises a topic layer.

17. The non-transitory storage medium of claim 16, further comprising receiving a query from a user, identifying a topic based on the query using topic modelling, and loading the corresponding topic-specific weights from the lookup table into the custom layer for generating an output.

18. The non-transitory storage medium of claim 10, further comprising generating an out of distribution when a similarity score or probability of an output generated by the domain adapted model in response to a query is below a threshold.

* * * * *